Dec. 24, 1957     H. J. M. FÖRSTER     2,817,250
INFINITELY VARIABLE POWER TRANSMISSIONS
Filed Jan. 10, 1951     2 Sheets-Sheet 1
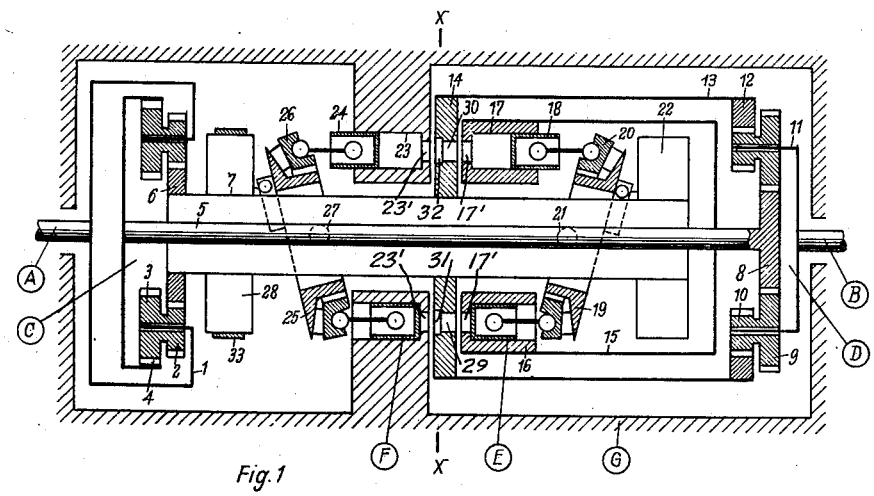
INVENTOR
HANS JOACHIM M. FÖRSTER
By *Alicke and Padlon*
ATTORNEYS Dec. 24, 1957   H. J. M. FÖRSTER   2,817,250
INFINITELY VARIABLE POWER TRANSMISSIONS
Filed Jan. 10, 1951   2 Sheets-Sheet 2
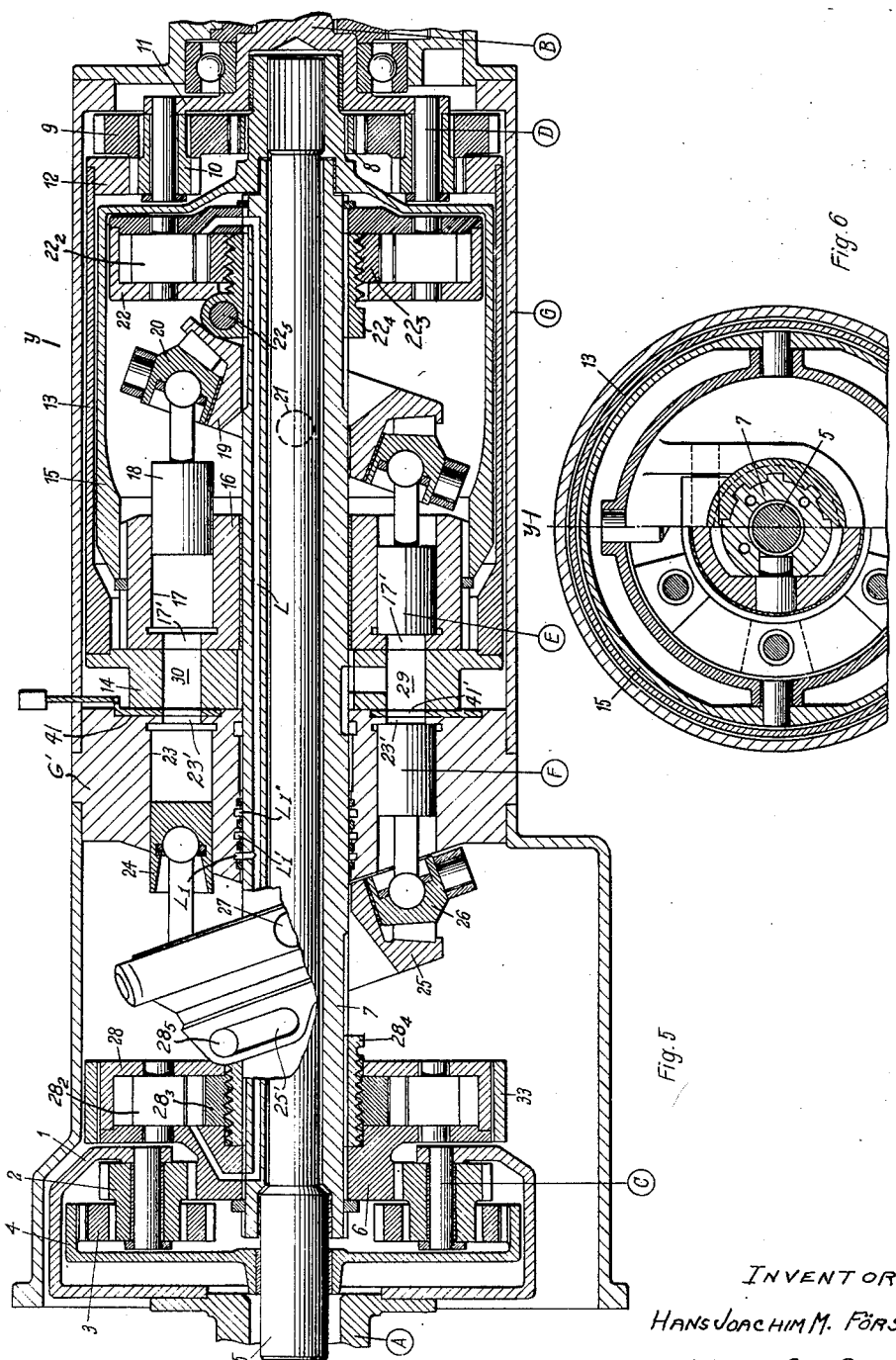
INVENTOR
HANS JOACHIM M. FÖRSTER
By Klithe and Padlon
ATTORNEYS United States Patent Office 2,817,250
Patented Dec. 24, 1957

2,817,250

INFINITELY VARIABLE POWER TRANSMISSIONS

Hans Joachim M. Förster, Stuttgart-Bad Cannstatt, Germany, assignor to Daimler-Benz Aktiengesellschaft, Stuttgart-Unterturkheim, Germany Application January 10, 1951, Serial No. 205,296

Claims priority, application Germany January 13, 1950

32 Claims. (Cl. 74—687)

This invention relates to infinitely variable power transmissions, and more particularly to infinitely variable power transmissions having a plurality of intermediate drive connections forming parallel branches and means for controlling the amount of torque transmitted through each intermediate or branch drive connection.

Accordingly, it is one object of the present invention to provide a transmission unit with as large as possible a control range in order to enable an infinitely variable torque conversion within this range with as high as possible an efficiency of the overall transmission unit.

A further object of the present invention is to provide a transmission unit in which one transmission or gearing is used for dividing into a plurality of intermediate drive connections the power or torque to be transmitted, another transmission or gearing is used for reuniting the power or torque to be transmitted, and a further torque converting transmission is used for effecting torque conversion between the various intermediate or branch drive connections in order to assure a simple and compact construction for the transmission, in particular, in such a manner that its diameter may be kept a minimum.

A further object of the present invention is to provide a simple and convenient control of the transmission unit.

Accordingly, an important feature of the present invention consists in that for purposes of splitting the power or torque to be transmitted into a plurality of intermediate or branch drive connections, a planetary gearing is used which divides the drive, i. e., splits or divides the power or torque to be transmitted into two intermediate or branch connections, and that for purposes of re-uniting the power or torque transmitted by the two intermediate or branch connections, a further planetary gearing is employed, while the two intermediate or branch connections are interconnected with each other by a torque converter means, preferably by an infinitely variable hydrostatic torque converter.

The transmission elements, which serve for purposes of dividing and re-uniting the drive, according to a further feature of the present invention, are constructed as cross-connected planetary gearings, preferably double planetary gearings, in such a manner that the sun wheel of each of the two planetary gearings is drivingly connected with the ring gear of the other planetary gearing and that the torque converter provides the connection between the thus cross-connected intermediate or branch connections. A variable driving ratio transmission or converter, which enables an internal splitting or dividing of the power or torque to be transmitted, serves to couple the two intermediate or branch connections with each other, such as, for example, an infinitely variable hydrostatic converter comprising, for instance, a variable volume fluid pump operatively connected with a variable volume fluid motor.

According to a further feature of the present invention, the arrangement and dimensions of the converter and of the entire transmission unit are such that both a step-down range and a step-up range of transmission ratios can be obtained. In that case, the converter possesses, for instance, a range of ratios from zero to infinity such that in the one extreme case the one intermediate or branch drive connection and in the other extreme case the other intermediate or branch drive connection is cut out of operation, i. e., is disabled and thereby inoperative to transmit any torque. The portion of power transmitted by the converter may increase, for instance, depending upon the speed ratio between the transmission input and output from zero to a maximum, for example, up to a value of 40 to 50 percent of the total transmitted power, and thereupon decreases again to zero, the curve of increase and decrease being appropriately such that the maximum of the hydraulic efficiency of the converter substantially coincides with the maximum of the portion of power transmitted by the converter while the portion of power transmitted by the converter becomes the smaller the lower the hydraulic efficiency thereof.

With such a type of transmission it is possible to obtain in a comparatively simple manner a torque conversion, in particular an infinitely variable torque conversion of a very high efficiency. Though hydraulic transmissions have an efficiency justifying their practical use in general only within a certain drive ratio range, it is possible, owing to the splitting or dividing of the power into intermediate or branch drive connections and by reason of the insertion of the hydraulic converter into the auxiliary branch connection coupling the two intermediate or branch drive connections, to hold the unfavorable influence of the efficiency of the hydraulic converter on the total efficiency of the transmission to a minimum and to practically cut out of operation or effectively disable the converter, for instance, in those speed ranges in which it operates at relatively low efficiencies. The use of such a converter which enables an internal dividing or branching of the power and which thereby permits a still further reduction of the effect of the hydraulic efficiency on the total efficiency contributes in particular to the realization of the aforementioned objects, so that the total transmission efficiency within the range of relatively low hydraulic efficiency is determined substantially only by the mechanical efficiency of both the planetary gearing and of the converter.

To provide a further improvement of the overall or total transmission efficiency, braking devices may be provided according to a further feature of the present invention in order to permit a positive braking of the intermediate or branch drive connections relative to the housing so as to eliminate any influence of the hydraulic converter upon the efficiency in the aforementioned extreme cases. A positive power transmission between input and output and producing a direct drive connection may also be provided while the hydraulic transmission is at the same time rendered entirely ineffective.

A further feature of the present invention consists in that, in order to obtain an especially compact design of the transmission unit, the intermediate or branch drive connections are arranged concentrically to each other, and more particularly in such a manner that input, output and the intermediate or branch drive connections as well as the torque converter coupling the two intermediate drive connections are arranged coaxially. As such a drive connection does not require a countershaft, a transmission unit having small diameter may be obtained which may be of great advantage for its installation, for instance, in vehicles.

Further objects, features and advantages will become apparent from the following detailed description when taken in connection with the accompanying drawing which shows, for purposes of illustration only, one preferred embodiment of the present invention, the scope of the invention, however, not being limited to this particular construction.

In the drawing:

Figure 1 is a longitudinal sectional view in diagrammatic form of an infinitely variable transmission unit in accordance with the present invention which is operative to split or branch the power to be transmitted and which includes two planetary gearings and a hydrostatic torque converter.

Figure 2 is a section taken along line x—x of Figure 1.

Figure 3a shows diagrammatically the power flow of the transmission in accordance with the present invention as illustrated in Figures 1 and 5 when the transmission is in low or first speed.

Figure 3b shows diagrammatically the power flow of the transmission illustrated in Figures 1 and 5 when the transmission is in second speed.

Figure 3c shows diagrammatically the power flow of the transmission illustrated in Figures 1 and 5 when the transmission is in third or direct speed.

Figure 3d shows diagrammatically the power flow of the transmission illustrated in Figures 1 and 5 when the transmission is in fourth speed or overdrive.

Figure 3e shows diagrammatically the power flow of the transmission illustrated in Figures 1 and 5 when the transmission is in reverse.

Figures 4a and b are diagrams indicating overall and converter efficiency and the relative amounts of power or torque transmitted by the various transmission parts respectively.

Figure 5 is one constructional embodiment of a transmission in accordance with the present invention, and Figure 6 is a section taken along line y—y of Figure 5 with the left-hand half looking toward the left and the right-hand half looking toward the right.

Referring now to the drawing wherein like reference characters are used throughout the various views to designate like parts, and more particularly to the constructional embodiment according to Figures 1 and 5 respectively, or according to the diagrams of Figure 3, reference character A designates the drive shaft and B the driven shaft of the transmission unit, for instance, of a motor vehicle. A planetary gearing C is used for dividing or splitting the power or torque to be transmitted into the two intermediate or branch drive connections I and II, while the planetary gearing D is provided for re-uniting the power or torque from connections I and II. The two intermediate or branch drive connections I and II are coupled with each other by a converter, which is adapted to internally divide or branch power or torque and which is designed as a hydrostatic transmission. The converter includes the fluid pump E and the fluid motor F, the latter having cylinders fixed relative to the housing G.

In detail, the arrangement is as follows: The drive shaft A has secured thereto the planet wheel carrier 1 for the double planet wheels 2 and 3 of the planetary gearing C. The larger planet wheel 3 drives the ring gear 4 which is secured to the inner shaft 5 extending through the whole transmission unit. The sun wheel 6 meshes with the smaller planet wheel 2 and is secured to a hollow shaft 7 concentrically surrounding the inner shaft 5.

The sun wheel 8 of the planetary gearing D is secured to the other end of the inner shaft 5 which is likewise constructed as a double planetary gearing with the planet wheels 9 and 10, the sun wheel 8 meshing with the larger planet wheel 9. The planet wheel carrier 11 of the planetary gearing D is secured to the driven shaft B. The smaller planet wheel 10 is in mesh with a ring gear 12, the latter being rigidly connected through the drum 13 and the disc 14 to the hollow shaft 7.

It will be observed in the arrangement described herein that the planetary gearings C and D are cross-connected since, on the one hand, the ring gear 4 of the planetary gearing C is connected through the one intermediate or branch drive connection II formed by the inner shaft 5 with the sun wheel 8 of the planetary gearing D, and, on the other hand, the sun wheel 6 of the planetary gearing C is connected through the other intermediate or branch drive connection I formed by elements 7, 14 and 13 with the ring-gear 12 of the planetary gearing D.

A drum 15 with a housing 16 is further secured to the inner shaft 5. The housing 16 includes the cylinders 17 of the fluid pump E. Pistons 18 may reciprocate in the cylinders 17. The pistons 18 are connected to a ring 20 rotatably mounted on the swash plate 19. The swash plate 19 is mounted on the hollow shaft 7 for rocking motion about a transverse axle or shaft 21 and can be adjusted in any suitable manner, for instance, by a hydraulically operated auxiliary motor 22, formed as a gear pump to be more fully described hereinafter.

Cylinder spaces 23, in which the pistons 24 of the fluid motor F may reciprocate, are provided in a similar manner in the stationary housing G. The pistons are connected to a ring 26 mounted on the swash plate 25. This swash plate 25 is mounted on the hollow shaft 7 for rocking motion about a transverse axle or shaft 27 and may be adjusted in any suitable manner, for example, by means of an auxiliary motor 28 secured to the hollow shaft 7 to be described more fully hereinafter.

To permit an exchange of fluid between the fluid pump and the fluid motor the cylinder spaces 17 and 23 are connected with each other through bores 29 and 30 provided in the disc 14 which bores 29 and 30 are coaxial with and of substantially the same diametric dimensions as the short extensions 23' and 17' of the cylinder spaces 23 and 17. The extensions 23' and 17' are provided in housing G and drum 15, respectively, and are directed toward each other. As shown in particular in Figure 2, the bores 29 and 30 respectively are interconnected in the disc 14 to provide a sickle-shaped pressure area 31 and a sickle-shaped suction area 32 respectively, both such areas extending symmetrically with relation to a plane determined by the axes of the pivots or shafts 21 and 27, for the swash plates. If desired, a stop member such as a disc-like plate or element 41 (Figure 5) may additionally be provided in that part of the stationary housing G which contains the bores 23'. The element 41 may be provided with circumferential bores 41' which permit the uninterrupted flow of the fluid when in alignment with the bores 23' while the flow is interrupted as soon as the element 41 is displaced angularly by an amount equal to the diameter of the bores therein so as to move the same out of alignment with the bores 23'. For purposes of positively braking the drive connection between intermediate or branch connections I and II, braking devices may further be provided of which, for instance, that for the intermediate or branch drive connection I is indicated at 33 on the housing of the auxiliary motor 28.

The auxiliary motor 22 is a hydraulic motor in the form of a gear pump. Oil under pressure is delivered and discharged from the hydraulic motor 22 through suitable conduits, only one of which L is shown. Annular groove $L_1$ provides a connection between conduit L formed in rotating shaft 7 and the supply line (not shown) extending through the stationary housing part G'. The hydraulic motor 22 is provided, as is conventional with two sides alternately operative as input side and output side. Conduit L leads to one side of the hydraulic motor 22 while another conduit (not shown) which is supplied over annular groove $L_1'$ is connected with the other side of the hydraulic motor 22. If, for example, the pressure in conduit L is maintained at a constant value, for instance, at 20 p. s. i., then the hydraulic motor 22 will be stationary if the pressure in annular groove $L_1'$ and the conduit connected therewith is also 20 p. s. i. If, however, the pressure in annular groove $L_1'$ and the conduit connected therewith drops below 20 p. s. i., then the hydraulic motor will rotate in one direction, while the direction of rotation thereof is reversed if the pressure in annular groove $L_1'$ and the conduit connected therewith exceeds 20 p. s. i. By suitably controlling the oil under pressure in annular groove $L_1'$, the difference in pressure between conduit L and the conduit connected to annular groove $L_1'$ causes the outer pump gear $22_2$ and the inner pump gear $22_3$ to rotate about their axes. The inner gear $22_3$ is provided with an internally threaded portion which threadably engages the sleeve $22_4$ to move the latter in the axial direction. The sleeve $22_4$ carries a stud $22_5$ which is connected with the swash plate 19 in any suitable manner, as for example, by engaging a slot (not shown) similar to the slot shown in swash plate 25.

The hydraulic motor 28 is essentially similar to the hydraulic motor 22 and comprises an outer pump gear $28_2$ which meshes with the inner pump gear $28_3$. Oil under pressure is again supplied to and discharged from the hydraulic motor through suitable conduits of which only the same conduit L is shown, which is connected with the stationary housing part G' over annular groove $L_1$ as described hereinabove. The hydraulic motor 28 is constructed in a similar manner as hydraulic motor 22 and is again provided, as is conventional, with two sides alternately operative as input side and output side. Conduit L leads to one side of the hydraulic motor 28 while another conduit (not shown) which is supplied over annular groove $L_1''$ is connected with the other side of the hydraulic motor 28. If, for example, the pressure in conduit L is maintained at a constant value, for example, at 20 p. s. i., the hydraulic motor 28 will remain stationary if the pressure in the annular groove $L_1''$ and the conduit connected therewith is of the same value. If, however, the pressure in annular groove $L_1''$ and the conduit connected therewith varies from this constant value either above or below, then the hydraulic motor 28 will rotate in the one or other direction of rotation as described hereinabove. By suitably controlling the oil under pressure in annular groove $L_1''$, the difference in pressure existing between conduit L and the conduit connected to annular groove $L_1''$ causes the pump gears $28_2$ and $28_3$ to rotate about their axes. The inner gear $28_3$ is provided with an internally threaded portion which threadably engages the sleeve $28_4$ to move the latter in the axial direction. The sleeve $28_4$ carries a stud $28_5$ which is connected with the swash plate 25 in any suitable manner, as for example, by engaging the slot 25' provided in the swash plate 25.

Five different transmission ratios are illustrated in Figures 3a—3e, the transmission unit of Figure 1, being represented therein in simplified diagrammatic form. The intermediate or branch drive connections I and II, which divide out in the planetary gearing C and re-unite in the planetary gearing D, are connected with each other by the converter E—F in such a manner that each of the two intermediate or branch drive connections is subdivided into two sections I', I'' and II', II'' respectively.

Figure 3 further shows in shaded lines the splitting of power transmitted by the various sections under the various conditions, the portion of power transmitted in the different branch sections being indicated by the width of the lines. For simplicity's sake, dividing or branching of the power within the converter is not illustrated in these figures but only the portion of power transmitted by the converted as a whole, the latter being the sum resulting from a mechanical portion which is transmitted from the piston 18 of the pump E directly to the shaft 7 and from a hydraulic portion which is transmitted by the pump E to the motor F by the displaced fluid.

In the diagram of Figure 4a the hydraulic efficiency $\eta_h$ of the converter and the total efficiency $\eta_g$ of the transmission are plotted against the speed ratio $\epsilon = \eta_A/\eta_B$ where $\eta_A$ is the speed of the input shaft A and $\eta_B$ the speed of the output shaft B. The various portions of power $\mu = L_x/L_a$ of the individual sections I', I'', II', II'' of the intermediate or branch connections I and II and of the converter E—F respectively are also plotted against the speed ratio $\epsilon = \eta_A/\eta_B$, the same scale being used for $\epsilon$ as in Figure 4a, whereby $L_a$ designates the total power input of the transmission unit and $L_x$ the power transmitted by the particular transmission part in question. The four transmission ratios diagrammatically illustrated in Figures 3a, b, c, d are indicated in Figure 4 in the horizontal direction along the abscissa, for instance, by the speed ratios $\epsilon_a$ to $\epsilon_d$, while such portions of the total power, transmitted by the individual sections of the intermediate or branch drive connections are represented by the curves $\mu_I'$, $\mu_I''$, $\mu_{II}'$ and $\mu_{II}''$.

*Operation*

The operation of the transmission of the present invention under various conditions and in the various transmission ratios, designated hereinafter as "cases," is as follows:

*Case a.*—In the case of Figure 3a, which corresponds to a transmission ratio $\epsilon_a$, in Figure 4, the swash plate 19 for the fluid pump E is in its vertical position, while the swash plate 25 for the fluid motor F is adjusted to a positive inclination. Consequently, there will be no delivery from the fluid pump E and the fluid motor F is accordingly locked with respect to the housing G. The intermediate or branch drive connection I consisting of sections I' and I'' is at a standstill and the intermediate or branch drive connection II consisting of sections II' and II'' is rotated at a speed determined by the speed of drive shaft A and the planetary gearing C, while the driven shaft B continues to rotate at a speed determined by the planetary gearing D, for instance, at a stepped-down or reduced speed with respect to the drive A. In this case, as appears clearly from Figure 3a and the diagram of Figure 4b, the power is transmitted only by the intermediate or branch drive connection II, while there is no power input into the intermediate or branch drive connection I and into the converter E—F, as appears also from Figure 4b in which the power $\mu_E$ transmitted by the converter is zero at or below a transmission ratio $\epsilon_a$. The ordinarily unfavorable hydraulic efficiency $\eta_h$ of the converter (Figure 4a) consequently cannot affect the total efficiency $\eta_g$ which is determined substantially only by the mechanical efficiency of the planetary gearings C and D. Positive braking of the intermediate or branch drive connection I, for instance, by means of the brake 33, permits a further improvement of the efficiency, thereby avoiding oil leakages and reducing the bearing load.

*Case b.*—As the swash plate 19 for the fluid pump E is adjusted to a positive slanting position, the fluid pump E begins to deliver pressure fluid which has as a consequence that with an increase in the difference of speed between the intermediate or branch drive connection I and the housing G, an increase in the transmission of power through the converter will take place. The hydraulic efficiency of the converter in that case increases from zero at or below $\epsilon_a$ to its maximum near $\epsilon_b$ (Figure 4a). However, the portion of power transmitted by the converter to the total power transmitted increases in a similar manner, as illustrated in Figure 4b, wherein the curve $\mu_E$ representing the ratio of power transmitted by the converter to the total power $L_a$ increases from zero at $\epsilon_a$ to approximately maximum at $\epsilon_b$.

In the case of Figure 3b which corresponds to a transmission ratio of $\epsilon_b$ in Figures 4a and 4b the two swash plates 19 and 25 are adjusted to a positive inclination and for the same swept volume of the pistons. Owing to the fact that the two swash plates 19 and 25 are always rotating at the same speed and that the quantity of delivery of the fluid pump E must at any time be equal to the capacity of the fluid motor F, the speed difference between swash plate 25 and housing G, on the one hand, must also be equal to the speed difference between swash plate 19 and drum 15, on the other, i. e., the speed difference between intermediate or branch drive connection I formed by shaft 7 and housing G is equal to the speed difference between the intermediate or branch drive connections I and II. Consequently, the intermediate drive connection II rotates at double the speed as intermediate connection I. The power introduced at A, in that case, is split or divided in the planetary gearing C in such a manner that the section II' of the intermediate or branch drive connection II takes up a greater portion of power than the section I' of the intermediate or branch drive connection I (Figure 2b). However, within the converter, a portion of the power, for instance, $\mu_E = 40$ to 50 percent approximately of the total power, as shown in Figure 4b is transmitted internally to the intermediate or branch drive connection I so that the section I'' of the latter transmits for its part a greater portion of power than the section II'' as indicated by the curves in Figure 4b at $\epsilon_b$ in which $\mu_I'' > \mu_{II}''$ while $\mu_{II}' > \mu_I'$ thereby indicating the amount of power transferred within the converter. The power $\mu_E$ transmitted at this point $\epsilon_b$ by the converter E—F reaches its maximum, approximately simultaneously with the maximum hydraulic efficiency $\eta_h$ of the converter. The resulting overall transmission ratio of the transmission unit in that case likewise is a stepped-down or reduced drive, although the total reduction is less than in case *a* since $\epsilon_a < \epsilon_b$.

*Case c.*—Figure 3c which corresponds to the point $\epsilon_c$ of Figures 4a and 4b shows the case of a direct drive connection. The swash plate 25 is in its vertical position while the swash plate 19 is adjusted to the same positive inclination as before in case *b*. The vertical position of the swash plate 25 has as a result that the fluid motor F cannot receive any fluid so that the fluid pump E is consequently prevented from delivering any fluid. However, this will be only the case with the swash plate 19 inclined if the intermediate or branch drive connections I and II rotate at the same speed. Accordingly, the planetary gearings C and D must likewise be locked in themselves, so that a direct drive from A to B wlil be produced thereby. If so desired, the exchange of fluid from E to F may also be positively interrupted, for instance, by a slide valve 41 or the like.

In Figure 4 the direct drive at the speed ratio $\epsilon = 1$ is indicated, for instance, by the point $\epsilon_c$. The division or splitting of power into the two intermediate or branch connections is similar under these conditions to that illustrated in Figure 3b; however, a greater portion of power than in the preceeding case *b* is transmitted from the planetary gearing C to the intermediate or branch drive connection I. The power input of the converter in that case substantially corresponds to that in Figure 3b.

This is due to the fact that the hydraulic motor F in a given position of shaft 7 now delivers pressure fluid with those pistons 24 with which it previously sucked in the hydraulic fluid, while it draws in the hydraulic fluid with those pistons 24 with which it previously delivered the hydraulic fluid. Consequently,

*Case d.*—If the swash plate 25 is adjusted to a negative inclination opposite to that in Figures 3a and *b*, an overdrive is provided owing to the fact that the number of strokes imparted to the fluid motor F is higher than that of the fluid pump E so that the former acts as a pump as will appear more fully hereinafter.

The swinging movement of the swash plate 25 to a position opposite to that of Figures 3a and 3b, for example, the gradual swinging movement of swash plate 25 from its vertical position in Figure 3c to the inclined position of Figure 3d has as a result that the hydraulic motor F now delivers pressure fluid to the previous pump E from which it had previously received pressure fluid.

Consequently, the previously hydraulic motor F becomes a pump and the previous hydraulic pump E becomes a hydraulic motor and can receive the oil pumped by F only if its pistons 18 thereof reciprocate correspondingly in their cylinders 17. In order that this may take place, the shafts 5 and 15 must rotate slower than the shaft 7. The more the swash plate 25 is tilted, the slower shaft 5 must turn relative to shaft 7. When the angle of inclination of the two swash plates 19 and 25 is the same, the shaft 5 must stand still (Figure 3d) as only then the quantity of oil delivered by the now pump F during one rotation thereof is equal to the quantity of oil received by the motor E.

Thus, in Figure 3d the swash plate 19 is adjusted to a positive inclination and the swash plate 25 to a negative inclination of equal amount. The power is transmitted only by the intermediate or branch drive connection I while the intermediate or branch drive connection II and the converter are hydraulically relieved at a standstill. Therefore, apart from leakages, only the mechanical efficiency of the converter is of importance for the total efficiency. Consequently, the speed ratio $\epsilon_d$ is only determined by the speed ratios of the planetary gearings C and D.

The same speed ratio can be obtained theoretically also by positively braking the intermediate drive connection II which would permit the avoidance of hydraulic leakages.

*Case e.*—This case corresponds to Figure 3e which illustrates the reverse drive. If the swash plate 19 is adjusted from the position in Figure 3a into a negative slanting position opposite to that shown in Figure 3b, while the swash plate 25 is retained in the position shown in Figure 3a, a reverse drive will be obtained.

Upon swinging the swash plate 19 from the position shown in Figure 3a toward the left, the operation of oil pump and oil motor also reverses as in the case of overdrive, explained hereinabove in connection with Figure 3d. Consequently, F now becomes the pump and E the motor. As the pump F delivers pressure fluid, the motor E can receive the correspondingly delivered quantity thereof only if the pistons 24 also commence to reciprocate. This means, however, that the shaft 7 must start to rotate in the reverse direction. The overall drive ratio thereby does not immediately result in a reverse but it first reaches a neutral at which time the power delivery shaft B stands still, although the power input shaft A rotates. Only with a further swinging movement of the swash plate 19 to the left is the shaft 5 caused to rotate in the reverse direction so rapidly that in cooperation with the planetary gearings C and D a reverse rotation is achieved for the overall transmission unit.

The fact that a reverse speed is obtained under these conditions will also be obvious from the following consideration if the position of the swash plates 19 and 25 are noted by going back from Figure 3b over Figure 3a to the position thereof indicated in Figure 3e. Figure 3b shows a position of the swash plates 19 and 25 in which a higher speed is obtained, whereas the position of these swash plates in Figure 3a indicates a lower speed. The only change which took place in order to obtain the reduction in the speed was the pivotal movement of the swash plate 19 from the positive inclination thereof in Figure 3b to a position thereof perpendicular to the shaft in Figure 3a. The swash plate 25 remained constant in both Figures 3a and 3b. If the swash plate 19 is now adjusted to assume a negative inclination, as illustrated in Figure 3e, then the suction and pressure side are reversed in the pump E whereby this pump supplies in the opposite direction so that ultimately the motor F, as an accurate theoretical examination would demonstrate, drives the swash plate 25 in a more or less reversed direction thereby obtaining the reverse speed.

What I claim is:

1. A transmission unit serving for torque conversion, comprising a driving member, a first planetary gearing having three transmission members, one transmission member thereof being connected to said driving member, two concentric intermediate drive connections, each being connected respectively to the second and third transmission members of said first planetary gearing, a second planetary gearing having three transmission members, the first and the second transmission member thereof being connected to one each of said two intermediate drive connections, a driven transmission member which is connected to the third transmission member of said second planetary gearing, variable torque converter means between said two intermediate drive connections and control means for adjusting said torque converter means to vary the amount of torque transmitted between said two intermediate drive connections by said variable torque converter means.

2. A transmission unit serving for torque conversion, comprising a driving member, a first planetary gearing having three transmission members, one transmission member thereof being connected to said driving member, two concentric intermediate drive connections each being connected respectively to the second and third transmission members of said first planetary gearing, a second planetary gearing having three transmission members, the first and the second transmission member thereof being connected to one each of said two intermediate drive connections, a driven transmission member which is connected to the third transmission member of said second planetary gearing, variable hydraulic torque converter means between said two intermediate drive connections, and control means for selectively adjusting said torque transmitted between said two concentric intermediate drive connections by said variable hydraulic torque converter means.

3. A transmission unit serving for torque conversion comprising a driving member, a first planetary gearing having a planet wheel carrier connected to said driving member, a sun wheel and an outer drum wheel, two intermediate drive connections with the first one thereof being connected to said sun wheel and the other one with said outer drum wheel, a second planetary gearing having a planet wheel carrier, a sun wheel connected to said other intermediate drive connection, and an outer drum wheel connected to said one intermediate drive connection, a driven member connected to the planet wheel carrier of said second planetary gearing, and variable torque converter means operatively connected between said two intermediate drive connections.

4. A transmission unit serving for torque conversion, comprising a stationary member, a driving member, a first planetary gearing having three transmission members, one of said transmission members thereof being connected to said driving member, two concentric intermediate drive connections each being connected respectively to a second and a third transmission member of said first planetary gearing, a second planetary gearing having three transmission members the first and the second transmission member thereof being connected to one each of the two intermediate drive connections, a driven member connected to the third transmission member of said second planetary gearing, and a torque converter comprising a fluid pump comprising a piston member drivingly connected to the one intermediate drive connection, and a cylinder member drivingly connected to the other intermediate drive connection, a fluid motor having a piston member and a cylinder member, one portion of said motor being drivingly connected to one said intermediate drive connection and the other portion connected to said stationary member, and means for varying the piston strokes of the fluid pump and of the fluid motor.

5. A transmission unit as defined in claim 4 wherein the last mentioned means comprise two adjustable swash plates, each of said swash plates being connected with that intermediate drive connection to which is drivingly connected both the fluid pump and the fluid motor, said means being adapted to produce a reciprocating relative motion of piston member and cylinder portion of the fluid pump and fluid motor.

6. A transmission unit as defined in claim 4 further comprising means in said torque converter for blocking the hydraulic connection between said fluid pump and fluid motor.

7. A transmission unit as defined in claim 4 further comprising means for changing-over the hydraulic connection between said fluid pump and fluid motor such that the transmission unit is capable of being changed-over from forward drive to reverse drive.

8. A transmission unit as defined in claim 4, further comprising means for adjusting said last mentioned means such that the piston stroke of at least one of the assemblies consisting of pump and motor with relation to the other assembly is capable of being adjusted from positive through zero to negative.

9. A transmission unit serving for torque conversion comprising a driving member, a planet wheel carrier of a first planetary gearing connected to said driving member, a sun wheel and an outer drum wheel for said first planetary gearing, a second planetary gearing arranged coaxially with said first planetary gearing, a sun wheel, and an outer drum wheel and a planet wheel carrier for said second planetary gearing, a driven member connected to said planet wheel carrier, an inner intermediate shaft connecting the outer drum wheel of the one planetary gearing to the sun wheel of the other planetary gearing, an outer hollow shaft connecting the sun wheel of the one planetary gearing to the drum wheel of the outer planetary gearing and being designed in the portion adjacent the latter as a hollow drum having a greater diameter, a torque converter comprising a fluid pump assembly and a fluid motor assembly, the one assembly being arranged between the inner shaft and the drum-shaped portion of the outer hollow shaft, the other assembly being arranged outside the outer hollow shaft within the range of its smaller diameter.

10. A transmission unit as defined in claim 9, wherein the inner shaft connects the outer drum wheel of the first planetary gearing with the sun wheel of the second planetary gearing and the outer hollow shaft connects the sun wheel of the first planetary gearing with the outer drum wheel of the second planetary gearing, the fluid pump assembly being arranged within the drum-shaped portion of the hollow shaft and the fluid motor assembly outside the hollow shaft portion having a smaller diameter.

11. A transmission unit as defined in claim 9 wherein the connecting member between that part of the hollow shaft having a smaller diameter and the drum-shaped portion of the hollow shaft is designed as a valve disc for valving the hydraulic connection between fluid pump and fluid motor.

12. A transmission unit as defined in claim 9, in combination with adjustable swash plates for driving the fluid pump and the fluid motor which are connected to the outer hollow shaft.

13. A transmission unit according to claim 6 in which the two intermediate drive connections comprise two shafts, one being hollow and coaxially surrounding the other.

14. A transmission unit serving for torque conversion, comprising a stationary member, a driving member, a first planetary gearing having three transmission members, one of said transmission members thereof being connected to said driving member, two concentric intermediate drive connections each being connected respectively to a second and a third transmission member of said first planetary gearing, a second planetary gearing having three transmission members, the first and the second transmission member thereof being connected to one each of the two intermediate drive connections, a driven member connected to the third transmission member of said second planetary gearing, and a torque converter comprising a fluid pump including a piston member drivingly connected to one of said intermediate drive connections, and a cylinder member drivingly connected to the other of said intermediate drive connections, a fluid motor having a piston member and a cylinder member, one portion of said motor being drivingly connected to one said intermediate drive connections and the other portion thereof being connected to said stationary member, and means for varying the piston strokes of the said fluid pump and of said fluid motor, together with a valving disc which is connected to that intermediate drive connection to which is drivingly connected both the fluid pump and the fluid motor, and which controls a hydraulic connection between the fluid pump and the fluid motor.

15. A transmission unit serving for torque conversion, comprising a driving member, a first planetary gearing having three transmission members, one of said transmission members thereof being connected to said driving member, two concentric intermediate drive connections each being connected respectively to the second and third transmission members of said first planetary gearing, a second planetary gearing having three transmission members, the first and the second transmission member thereof being connected to one each of said two intermediate drive connections, a driven transmission member which is connected to the third transmission member of said second planetary gearing, a variable hydraulic drive connected between said two intermediate drive connections, and means for so regulating said variable hydraulic drive connection that only said one intermediate drive connection but also said other one is capable of being cut out of operation.

16. A transmission unit serving for torque conversion, comprising a driving member, a first planetary gearing having three transmission members, one of said transmission members thereof being connected to said driving member, two concentric intermediate drive connections each being connected respectively to the second and third transmission members of said first planetary gearing, a second planetary gearing having three transmission members, the first and the second transmission member thereof being connected to one each of said two intermediate drive connections, a driven transmission member which is connected to the third transmission member of the second planetary gearing, and a variable hydraulic drive connected between said two intermediate drive connections, together with a stationary member and means for braking each of said intermediate drive connections relative to said stationary member.

17. A transmission unit serving for torque conversion, comprising a stationary member, a driving member, a first planetary gearing having three transmission members, one of said transmission members thereof being connected to said driving member, two concentric intermediate drive connections each being connected respectively to a second and a third transmission member of said first planetary gearing, a second planetary gearing having three transmission members, the first and the second transmission member thereof being connected to one each of said two intermediate drive connections, a driven member connected to the third transmission member of said second planetary gearing, and a torque converter comprising a fluid pump including a piston member drivingly connected to one of said intermediate drive connections, a cylinder member drivingly connected to the other intermediate drive connection, a fluid motor having a piston member and cylinder member, one portion of said motor being drivingly connected to said one intermediate drive connection and the other portion thereof being connected to said stationary member, means for varying the piston strokes of said fluid pump and of said fluid motor, said varying means comprising at least one swash plate connected to said one intermediate drive connection, and means for so adjusting said swash plate that it is capable of being adjusted with relation to its axis of rotation from an angle smaller than ninety degrees to its axis through an angle of ninety degrees to an angle beyond ninety degrees.

18. A transmission unit serving for torque conversion, comprising a driving member, a first planetary gearing having three transmission members, one of said transmission members being connected to said driving member, two concentric intermediate drive connections each being connected respectively to the second and third transmission members of said first planetary gearing, a second planetary gearing having three transmission members, the first and the second transmission members thereof being connected to one each of said two intermediate drive connections, a driven transmission member which is connected to the third transmission member of said second planetary gearing, and a variable drive connection between said two intermediate drive connections, said two intermediate drive connections comprising shafts arranged concentrically with relation to each other, and the variable drive connection including adjustable control-members mounted on the outer of the two concentric shafts.

19. A transmission unit serving for torque conversion, comprising a driving member, a first planetary gearing having a planet wheel carrier connected to said driving member, a sun wheel and an outer drum wheel, two intermediate drive connections, the first one thereof being connected to said first-named sun wheel and the other one thereof with said first-mentioned outer drum wheel, a second planetary gearing having a planet wheel carrier, a sun wheel connected to said other intermediate drive connection, an outer drum wheel connected to one first intermediate drive connection, a driven member connected to the planet wheel carrier of said second planetary gearing, and a variable drive connection operatively connected to said two intermediate drive connections, the planetary gearings each comprising pairs of coaxially arranged interconnected planet wheels and control means for optionally varying the amount of torque transmitted between said two intermediate drive connections by said variable drive connection.

20. A transmission unit serving for torque conversion, comprising a driving member, a first planetary gearing having three transmission members, one transmission member thereof being connected to said driving member, two concentric intermediate drive connections each being connected respectively to the second and third transmission members each of said first planetary gearing, a second planetary gearing having three transmission members, the first and the second transmission member thereof being connected to one each of said two intermediate drive connections, a driven transmission member which is connected to the third transmission member of said second planetary gearing, a variable drive connection, and means connecting said variable drive connection to said two intermediate drive connections, said two intermediate drive connections comprising shafts arranged concentrically with relation to each other, and said variable drive connection comprising adjustable control members.

21. A transmission unit serving for torque conversion comprising a driving member, a first planetary gearing having a planet wheel carrier connected to said driving member, a sun wheel and an outer drum wheel, two intermediate drive connections with the first one thereof being connected to the sun wheel, and the second one with the outer drum wheel, a second planetary gearing having a planet wheel carrier, a sun wheel connected to said second intermediate drive connection, and an outer drum wheel connected to said first intermediate drive connection, a driven member connected to the planet wheel carrier of said second planetary gearing, and a variable drive connection including an infinitely variable torque converter operatively connected between said two intermediate drive connections, the planetary gearings each comprising pairs of coaxially arranged interconnected planet wheels.

22. A transmission unit serving for torque conversion, comprising a driving member, a first planetary gearing having three transmission members, one transmission member thereof being connected to said driving member, two concentric intermediate drive connections each being connected respectively to the second and third transmission members of said first planetary gearing, a second planetary gearing having three transmission members, the first and the second transmission member thereof being connected to one each of the two intermediate drive connections, a driven transmission member which is connected to the third transmission member of said second planetary gearing, and variable hydraulic drive means operatively connected between said two intermediate drive connections for continuously varying the relative amounts of torque transmitted by said intermediate drive connections.

23. A transmission unit serving for torque conversion, comprising a driving member, a first planetary gearing having three transmission members, one transmission member thereof being connected to said driving member, two concentric intermediate drive connections each being connected respectively to the second and third transmission members of said first planetary gearing, a second planetary gearing having three transmission members, the first and the second transmission member thereof being connected to one each of the two intermediate drive connections, a driven transmission member which is connected to the third transmission member of said second planetary gearing, and a variable hydraulic drive connection with means for reversing the drive connected between the two intermediate drive connections.

24. A transmission unit serving for torque conversion, comprising a driving member, a first planetary gearing having three transmission members, one transmission member thereof being connected to said driving member, two concentric intermediate drive connections each being connected respectively to the second and third transmission members of said first planetary gearing, a second planetary gearing having three transmission members, the first and the second transmission member thereof being connected to one each of the two intermediate drive connections, a driven transmission member which is connected to the third transmission member of said second planetary gearing, and a variable hydraulic means operatively connected between said two intermediate drive connections for continuously and controllably varying the amount of torque transmitted thereby.

25. A multi-speed transmission unit serving for torque converter comprising input means, output means, two intermediate connecting means, first gear means having different transmission ratios for drivingly connecting said input means with one end of each of said two intermediate connecting means, second gear means having different transmission ratios for connecting the other end of each of said two intermediate connecting means with said output means, a hydraulic drive operatively connected between said two intermediate connecting means, and means in said hydraulic drive connection for continuously and controllably varying the amount of torque transmitted by said two intermediate connecting means and determining the effective transmission ratio of said gear means.

26. A multi-speed transmission according to claim 25, wherein said last-mentioned means includes means for reversing the drive of said transmission.

27. A transmission unit serving for torque conversion, comprising a driving member, a first planetary gearing having three transmission members, one transmission member thereof being connected to said driving member, two concentric intermediate drive connections each being connected respectively to the second and third transmission members of said first planetary gearing, a second planetary gearing having three transmission members, the first and the second transmission member thereof being connected to one each of said two intermediate drive connections, a driven transmission member which is connected to the third transmission member of said second planetary gearing, and only variable hydraulic drive means interconnecting said two intermediate drive connections.

28. In a multi-speed transmission unit serving for torque conversion comprising input means, output means, two intermediate connecting means, gear means having a plurality of fixed transmission ratios interconnecting said input means with said output means at all times through both intermediate connecting means, and variable hydraulic drive connecting means interconnecting said two interconnecting means for continuously and controllably varying the relative amount of torque transmitted by said two interconnecting means and for simultaneously and selectively determining each of said fixed transmission ratios.

29. A transmission unit serving for torque conversion, comprising a driving member, a first planetary gearing having a planet wheel carrier connected to said driving member, a sun wheel and an outer drum wheel, two intermediate drive connections, the first one thereof being connected with said sun wheel, and the other one with said outer drum wheel, a second planetary gearing having a planet wheel carrier, a sun wheel connected to said other intermediate drive connection, and an outer drum wheel connected to said first intermediate drive connection, and a driven member connected to the planet wheel carrier of said second planetary gearing, said two intermediate drive connections including shafts arranged concentrically with respect to each other and having torque transfer means therebetween.

30. A transmission unit serving for torque conversion, comprising a driving member, a first planetary gearing having three transmission members, one transmission member thereof being connected to said driving member, two concentric intermediate drive connections each being connected respectively to the second and third members of said first planetary gearing, a second planetary gearing having three transmission members, the first and the second transmission member thereof being connected to one each of said two intermediate drive connections, a driven transmission member connected to the third transmission member of said second planetary gearing, a variable drive connection including an infinitely variable torque converter between said two intermediate drive connections, and control means for varying the amount of torque transmitted between said two intermediate concentric drive connections by said variable drive connection.

31. A transmission unit serving for torque conversion, comprising a driving member, a first planetary gearing having three transmission members, one transmission member thereof being connected to said driving member, two concentric intermediate drive connections each being connected respectively to the second and third transmission members of said first planetary gearing, a second planetary gearing having three transmission members, the first and the second transmission member thereof being connected to one each of said two intermediate drive connections, a driven transmission member connected to the third transmission member of said second planetary gearing, a variable hydraulic drive connection including a hydrostatic torque converter between said two intermediate drive connections, and control means for selectively varying the amount of torque transmitted between said two concentric intermediate drive connections by said variable hydraulic drive connection.

32. A transmission unit serving for torque conversion, comprising a driving member, a first planetary gearing having three transmission members, one transmission member thereof being connected to said driving member, two concentric drive connections each being connected respectively to the second and third members of said first planetary gearing, a second planetary gearing having three transmission members, the first and second transmission member thereof being connected to one each of said two intermediate drive connections, a driven transmission member connected to the third transmission member of said second planetary gearing, a variable drive connection between said two intermediate drive connections, control means for varying the amount of torque transmitted between said two intermediate concentric drive connections by said variable drive connection, and means in said variable drive connection for changing the transmission from forward drive to reverse drive.

References Cited in the file of this patent

UNITED STATES PATENTS

| | | |
|---|---|---|
| 2,149,320 | Szekely | Mar. 7, 1939 |
| 2,296,929 | Ifield | Sept. 29, 1942 |
| 2,301,451 | Pollard | Nov. 10, 1942 |
| 2,364,448 | Jandasek | Dec. 5, 1944 |
| 2,543,584 | Meinecke | Feb. 27, 1951 |

FOREIGN PATENTS

| | | |
|---|---|---|
| 46,344 | France (Addition to 796,649) | Feb. 10, 1936 |
| 123,974 | Australia | Apr. 24, 1947 |